United States Patent [19]

Topper

[11] 4,015,323

[45] Apr. 5, 1977

[54] PIPE MATING TOOL

[76] Inventor: George William Topper, P. O. Box 9, Safford, Ariz. 85546

[22] Filed: May 10, 1976

[21] Appl. No.: 685,021

[52] U.S. Cl. .................................... 29/237; 29/267

[51] Int. Cl.$^2$ ........................................ B23P 19/04

[58] Field of Search ............ 29/237, 234, 267, 282; 269/40; 228/49

[56] References Cited

UNITED STATES PATENTS

| | | | |
|---|---|---|---|
| 1,894,835 | 1/1933 | Smith et al. | 29/237 |
| 2,958,125 | 11/1960 | Nichols | 29/237 |
| 3,281,929 | 11/1966 | Shinnick | 29/237 |
| 3,299,496 | 1/1967 | Christensen | 29/237 |
| 3,364,555 | 1/1968 | Swink | 29/237 |
| 3,653,115 | 4/1972 | Perkins | 29/237 |

*Primary Examiner*—James L. Jones, Jr.
*Attorney, Agent, or Firm*—Leitner, Palan & Martin

[57] ABSTRACT

A tool for mating two pipes, having two pairs of arcuate clamping jaws of adjustable locked diameter moved towards each other by a pair of linking means mounted to opposite sides of each pair of jaws so as to lie and move in a simple plane. Inserts are provided to further reduce the jaws locked diameter.

8 Claims, 2 Drawing Figures

PIPE MATING TOOL

BACKGROUND OF THE INVENTION

1. Field of the Invention

The present invention relates generally to pipe coupling or mating tools and more specifically to a tool for mating or coupling plastic pipes.

2. Description of the Prior Art

Devices or tools for coupling or securing pipe sections together are well known for metal, concrete and other materials. Because of the weight and rigidity of pipes of these materials, the clamping portion of the pipe tool could exert substantial amounts of force on the surface of the pipe in order to securely grip or hold the pipe. Similarly, the levers or other elements which produce the longitudinal movement of the pipes toward each other have to be fairly substantial in order to move the weight of the two pipe sections. Since the joint is generally not a press fit joint, the force needed to join the pipes does not have to be substantial.

With the increased use of plastic—for example, polyethylene—pipes in the plumbing of houses and other buildings, there exists a need for a tool which will mate or joint two plastic pipes. The pipe couplers of the prior art are not applicable to plastic pipes since their clamping means would substantially mar the exterior of the pipe, collapse, or seriously effect the integrity of the pipes. Similarly, the prior art pipe coupling tools have not been adapted or capable to joining pipes of one half inch to approximately four inch diameters. Plastic pipes are not as rigid as other pipes and thus offer alignment problems during mating.

Thus there exists a need for a pipe mating or coupling tool specifically designed for the coupling of plastic pipes.

SUMMARY OF THE INVENTION

The present invention is a tool for mating two pipes, preferably plastic pipes, having two pairs of arcuate clamping jaws moved towards each other by a pair of linking means mounted to opposite sides of each pair of jaws so as to lie and move in a simple plane from a first position to a second position to decrease the distance between the clamping jaws. The length of the arcuate jaws is greater than the diameter defined by the jaws closed so as to distribute the clamping pressure of the jaws and to add rigidity and align the two pieces of pipe to be joined. The arcuate jaws are pivotally connected at one pair of adjacent edges and are adjustably connected by a locking means at another pair of adjacent edges. The locking means is a lever pivotally connected to one jaw and having a loop thereon which cooperates or coacts with a threaded post adjustably mounted to the other jaw so as to define the locked diameter of the jaws. An arcuate insert having a pair of threaded posts thereon is received by a pair of apertures in an arcuate jaw and adjustably held thereon by a pair of stops on the threaded posts. The inserts further reduce the locked diameter and allow coupling pipes down to one half inch diameter. The pair of linking means each include a lever pivotally mounted to one pair of said clamping jaws and a linkage pivotally connected at one end to the other pair of said clamping jaws and at the other end to said lever. The levers, by lying and moving in a single plane, reduces alignment error of the flexible plastic pipe and thereby increases the integrity of the force fit pipe joint.

OBJECTS OF THE INVENTION

An object of the present invention is to provide a tool specifically designed for plastic pipe.

Another object is to provide a coupling tool which distributes the clamping pressure across the surface of the pipes to be joined.

A further object is to provide a lever system which minimizes the alignment error and increases the integrity of the joint of plastic pipes.

Still another object is to provide a tool for mating plastic pipes capable of accommodating pipes from one half to four inch diameters.

A still further object is to provide a mating or coupling tool for plastic pipes which produces a force fit joint without decreasing the integrity of the pipes.

Other objects, advantages, and novel features of the present invention will become apparent from the following detailed description of the present invention when studied in conjunction with the accompanying drawings.

DESCRIPTION OF THE PREFERRED EMBODIMENTS

Figure 2:
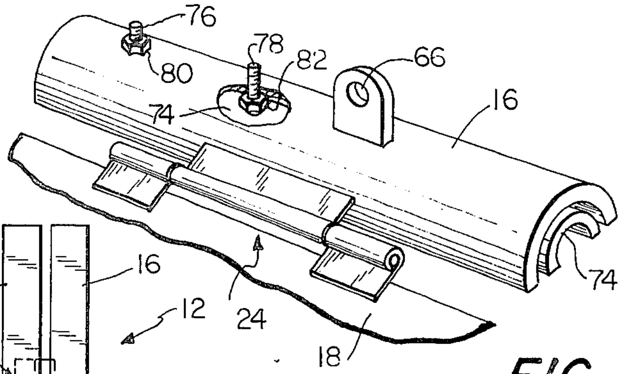
FIG. 2 is a perspective, cut-away view of one pair of jaws with an insert.
Figure 1:
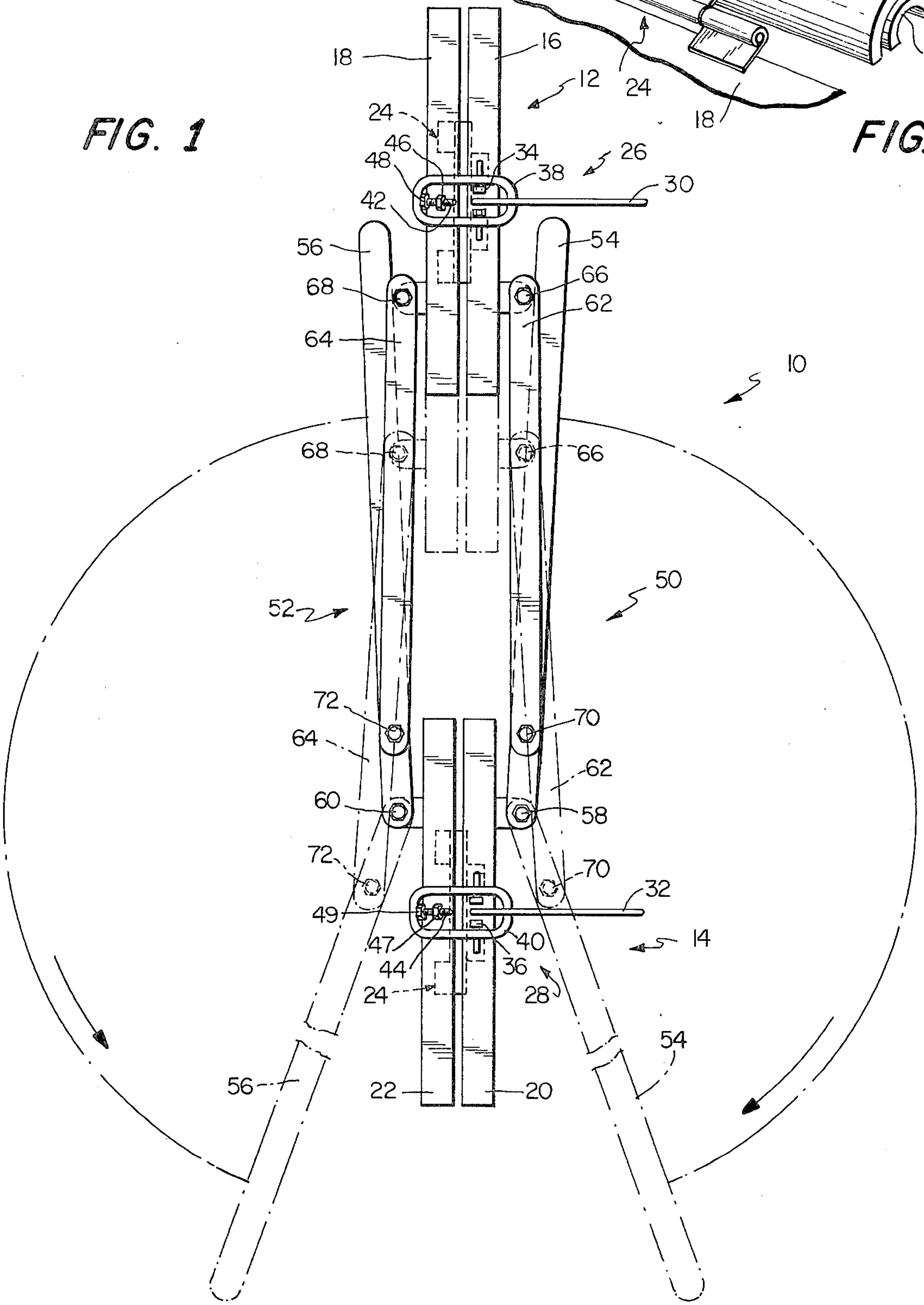
FIG. 1 is a top elevation view of a preferred embodiment of the tool of the present invention.

A pipe mating tool 10, as illustrated in FIGS. 1 and 2, includes a pair of clamps 12 and 14 each including a pair of arcuate jaws 16 and 18 and 20 and 22 respectively. As can be seen, the length of the arcuate jaws 16, 18, 20, and 22 is substantially greater than the diameter of the jaws.. This is to allow a distribution of the clamping pressure along the length of the pipe as well as adding a degree of rigidity to a normally flexible pipe which is to be clamped in the jaws and mated by the mating tool 10. This degree of rigidity produced by the length of the jaws increases the accuracy and the integrity of the joint formed by the mating of the pipes. Jaws 16 and 18 and jaws 20 and 22 are pivotally connected at a pair of adjacent edges by a hinge 24, illustrated in detail in FIG. 2. A locking mechanism 26 for clamp 12 and 28 for clamp 14 adjustably joins the other adjacent edges of arcuate jaws 16 and 18 and 20 and 22 respectively. The locking mechanism 26 and 28 include a lever 30 and 32 pivotally mounted to arcuate jaws 16 and 20 at 34 and 36 respectively by a pin and a pair of projections. Loops 38 and 40 are connected to levers 30 and 32 respectively and coact with stops 48 and 49 on threaded posts 42 and 44 which are adjustably mounted to arcuate jaws 18 and 22 respectively. Internally threaded anchors 46 and 47 are mounted to jaws 18 and 22 and adjustably receive posts 42 and 44 respectively to adjust the position of stops 48 and 49. This adjustment allows for varying the closed or locked diameter between the jaws 16, 18, and 20, 22.

It should be noted that the interior of jaws 16, 18, 20, and 22 may be treated with a material having a high coefficient of friction. Similarly, the surfaces may be corrugated or roughened so as to increase the gripping or decrease the slippage of plastic pipes within the jaws without damaging, scratching, or otherwise deteriorating the exterior of the plastic pipes.

A pair of linking means 50 and 52 are connected to and determine the position of clamps 12 and 14 and consequently the pipe elements retained therein relative to each other. The linking means 50 and 52 include a lever 54 and 56 pivotally connected at 58 and 60 to arcuate jaws 20 and 22 respectively. The second element of linking means 50 and 52 is a linkage 62 and 64 pivotally connected at 66 and 68 to arcuate jaws 16 and 18 respectively and have their other ends pivotally connected at 70 and 72 to levers 54 and 56 respectivelly. Pivotal connections 58 and 60 lie one hundred and eightly degrees apart as do pivotal connections 66 and 68. These connections cause levers 54 and 56 and linkages 62 and 64 to all lie in a single plane. The movement of the levers and the linkages from a first position, as shown in FIG. 1, to a second position, as shown in phantom in FIG. 1, to decrease the distance between clamps 12 and 14 (indicated by the arrows) is in the single plane defined by the connections. The advantage of the specific linking means 50 and 52 lying in a single plane allows for accurate alignment and joining of the plastic pipes.. A source of misalignment in prior art devices is the lack of rigidity of the plastic pipes and forces placed on the clamps by non-planar motion of the linking means. These forces are reduced by designing the linking means 50 and 52 in the same plane and the rigidity of the pipes is improved by the length of the jaws.

In addition to the adjustment of stops 48 and 49 to vary the diameter of clamps 12 and 14 in the locked position, inserts may be provided to further decrease the internal diameter of the clamps 12 and 14. This is illustrated in FIG. 2 as an arcuate insert 74 having a pair of threaded post 76 and 78 received into a pair of apertures in arcuate jaw 16. A pair of stops 80 and 82, for each threaded post, adjustably secure the arcuate inserts 74 to arcuate jaw 16. It should be noted that only one of the stops is illustrated for each of the posts. The inside diameter is first defined by adjusting the internal stop 82 to determine the distance between arcuate insert 74 and arcuate jaw 16. Once this distance is determined and the post 76 and 78 is inserted through apertures in jaw 16, the exterior stops 80 are applied and tightened so as to securely fasten the arcuate insert 74 to the jaw 16 by both stops 80, 82 for both threaded posts engaging the jaw 16. It should be noted that insert 74 and jaw 16 is only one of the four insert and jaws which are provided.

The tool 10 is specifically designed for plastic pipes of a maximum diameter of approximately four inches and minimum diameter, with insert 74, of one half inch. Though an insert with a double stop is illustrated, it should be noted that a plurality of insert 74 may be provided having a single exterior stop 80 to fasten the insert to a jaw. By using the stops 80 and 82, a single adjustable insert 74 may be provided and therefor reduce the number of parts a workman would need to adapt the pipe mating tool various diameter pipes.

The operation of the pipe mating tool 10 begins with the adjustment of stops 48 and 49 for the diameter of the pipe being used and, if needed, the use of inserts 74 and the adjustment of stops 80 and 82. After this adjustment, one plastic pipe is inserted between jaws 16 and 18 and the second plastic pipe is inserted between jaws 20 and 22. Loops 38 and 40 are latched around stops 48 and 49 and the levers 30 and 32 are moved from a position out of the plane of FIG. 1, or to the left of the position shown, down to the right into the plane to the position shown. At this point, the pipes are retained by clamps 12 and 14 and portions of the pipe extending into the openings between the clamps have increased rigidity due to the length of the jaws of the clamps. Levers 54 and 56 are then grasped and moved from the position shown in FIG. 1 following the arrows in the same plane moving toward the final phantom position shown in FIG. 1. For plastic pipes, the two pieces of plastic pipes are moved towards each other with an insert between the pipes to assist in the alignment and the mating of the pipes. The pipes are each press fitted to the insert. Levers 30 and 32 are then rotated to open the jaws, allowing removal of the joined pipes. It has been found that the plastic pipes joined by the present tool will bust before leakage around the joint formed by the present tool.

Although the present mating tool has been described and specifically designed for plastic pipes, it should be noted that the present device may be used to mate pipes of other material. Certain features of the present invention were designed specifically for the unique requirements of plastic pipes, but the device may be used with pipes of other material and dimensions. From the preceding description of the preferred embodiments, it is obvious that the objects of the invention have been obtained. Although the invention has been described and illustrated in detail, it is to be clearly understood that the same is by way of illustration and example only and not in the way of limitation. The spirit and scope being limited only by the terms of the appended claims.

What is claimed is:

1. A tool for mating two pipes comprising:

a pair of clamping means, each holding one of said pipes, the axial length of said clamping means being greater than the diameter of said pipe; and a pair of linking means, each connected one hundred and eighty degrees apart to both of said clamping means so as to be in a single plane, movable in said plane from a first position to a second position to decrease the distance between said clamping means.

2. The tool according to claim 1 wherein said clamping means include a pair of arcuate jaws pivotally connected at one pair of adjacent edges and locking means connecting said jaws at another pair of adjacent edges, said locking means being adjustable to vary the diameter defined by said jaws in a locked condition, said clamping means encompassing said pipe.

3. The tool according to claim 2 wherein said locking means includes a lever pivotally mounted to one of said jaws adjacent to said other edges, a loop pivotally mounted to said lever, and a threaded post adjustably received by a fastener mounted to the other jaw of said pair for defining said locked diameter.

4. The tool according to claim 2 wherein said clamping means includes a pair of arcuate inserts removably mounted to a respective jaw, said inserts having a smaller radius than said jaw for further reduction of said locked diameter.

5. The tool according to claim 4 wherein said inserts are adjustably mounted to said respective jaw for even further reduction of said locked diameter.

6. The tool according to claim 5 wherein each of said jaws include a pair of apertures, said inserts include an arcuate body and a pair of threaded posts radially projecting from the exterior of said body, and a pair of stops adjustably received on each of said posts for adjustably mounting said inserts to said jaws through said apertures.

7. The tool according to claim 5 wherein said jaws having a maximum locked diameter of approximately four inches and, with said inserts, a minimum diameter of one half inch.

8. The tool according to claim 1 wherein each linking means includes a lever pivotally mounted one of said clamping means and a linkage pivotally connected at one end to the other clamping means of said pair and at its other end to said lever.

* * * * *